April 12, 1932.  W. B. LEACH, JR  1,853,983
METHOD OF DISCHARGING LIQUEFIED GAS
Filed July 10, 1931
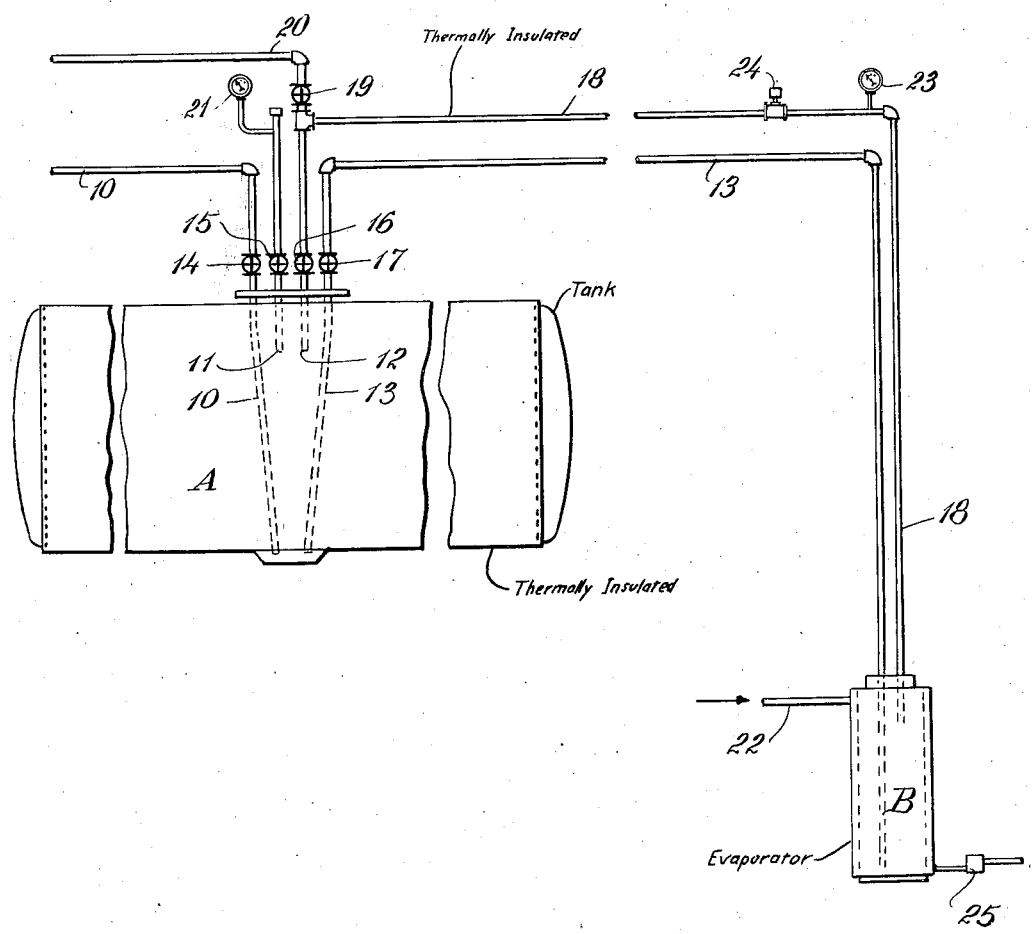
INVENTOR
WILLIAM B. LEACH, Jr.
BY
Pennie, Davis, Marvin + Edmonds
ATTORNEYS Patented Apr. 12, 1932

1,853,983

UNITED STATES PATENT OFFICE

WILLIAM B. LEACH, JR., OF NIAGARA FALLS, NEW YORK, ASSIGNOR TO THE MATHIESON ALKALI WORKS, INC., OF NEW YORK, N. Y., A CORPORATION OF VIRGINIA

METHOD OF DISCHARGING LIQUEFIED GAS

Application filed July 10, 1931. Serial No. 549,896.

This invention relates to methods of handling liquefied gases such as liquid anhydrous ammonia and liquid chlorine, more particularly to methods of unloading liquefied gases from tanks, tank cars and the like.

In the discharge of liquefied gases from tanks and tank cars, one common expedient has been the use of air pressure to force the liquid from the tank, but this method of handling liquefied gases has certain disadvantages and, in some cases, disabilities. For example, in the case of anhydrous ammonia, contaminating gases present in the air used to discharge the ammonia from the tank are very objectionable and, in the case of chlorine, moisture usually present in the air entails objectionable reactions.

This invention provides a particularly advantageous method of discharging such liquefied gases from tanks, tank cars and the like by self-generated pressure and without contact with air or other foreign gas.

Briefly, the method of the present invention consists in flowing a small amount of the liquefied gas from the tank or tank car to an evaporator where it is evaporated by the application of heat and returning the evaporated gas from the evaporator to the tank or tank car. This evaporated gas, returned to the tank or tank car, condenses in the colder liquid therein and in doing so gives up its latent heat and part of its specific heat, thereby warming the liquid and consequently increasing the vapor pressure of the liquid. This operation is repeated, if necessary, until the increase in self-generated vapor pressure in the tank or tank car is sufficient to effect the required discharge of liquefied gas therefrom.

The invention will be further described in connection with the accompanying drawing which illustrates an arrangement of apparatus adapted for carrying out the invention.

The tank A, for example the tank unit of a tank car, is the receptacle from which the liquefied gas is to be discharged. The evaporator B is shown as a small evaporator arranged externally of the tank A and heated by a steam jacket, but it will be understood that the exact construction and arrangement of the evaporator may be varied widely.

Two discharge pipes, 10 and 13, and two pressure pipes, 11 and 12, are arranged extending into the tank A. Flow through these pipes is controlled by means of valves 14, 15, 16 and 17. Discharge pipe 13 connects the lower part of the tank A with the lower part of the evaporator B. Pressure pipe 12 connects the upper part of the tank A with the upper part of the evaporator B through pipe 18. By means of valve 19, in conjunction with valve 16, gas flowing through pipe 18 may also be discharged to the atmosphere through pipe 20.

A pressure gauge 21 is connected to pressure pipe 11 for indicating the pressure in tank A. A pressure gauge 23, as well as a safety disk 24, is also connected to pipe 18. The evaporator B is heated, for example, by steam supplied through pipe 22, resulting condensate being discharged through trap 25.

During transportation or storage, the valves 14, 16 and 17 are closed; the valve 15 may be open or shut as desired.

When it is desired to discharge liquefied gas from tank A, the following steps are taken: Valve 17 is first opened, connecting tank A with evaporator B, and valve 19 is then opened, connecting evaporator B with the atmosphere. Alternatively, valve 17 is first opened and, valve 19 being closed, cooling water is circulated through the jacket on the evaporator B to reduce the pressure therein to a value less than that prevailing in tank A. Liquid from tank A then flows through pipe 13 into the interior of the evaporator B. Just before the liquid in the evaporator reaches the level of the lower end of pipe 18, which extends only a short way into the evaporator, valves 19 and 17 are closed and valve 16 is opened. Heat is then applied to the liquid in the evaporator B and the evaporated gas is returned to the tank A through pipes 18 and 12. On reaching the tank A, the evaporated gas condenses in the colder liquid in the tank, giving up its latent heat and part of its specific heat and thereby warming up the liquid in the tank and consequently raising its vapor pressure. If necessary, this operation is repeated until the required pressure is established in tank A. Valve 14 is then opened to discharge the liquefied gas from the tank A as required through pipe 10.

If the pressure within the tank A is insufficient even to discharge to evaporator B the initial small amount required to start the operation, pipe 20 may be connected to some suitable exhausting means for this purpose.

This method of handling liquefied gases has several advantages which will be readily apparent. In the case of liquid anhydrous ammonia, it substantially eliminates danger of contamination of the ammonia prior to discharge from the tank. In the case of liquid chlorine, it eliminates the danger of corrosion of the tank incident to any introduction of moisture into the chlorine in the tank.

I claim:

1. A method of discharging liquefied gas from tanks, which comprises withdrawing part of the liquefied gas from the tank, evaporating the liquefied gas withdrawn and condensing the resulting vapor in the liquefied gas in the tank thereby raising the vapor pressure of the liquefied gas in the tank, whereby the liquefied gas may be discharged from the tank under self-generated pressure.

2. A method of discharging liquefied gases from tanks, which comprises withdrawing part of the liquefied gas from the tank, heating the liquefied gas withdrawn to evaporate it, and condensing the resulting vapor in the liquefied gas in the tank thereby raising the vapor pressure of the liquefied gas in the tank, whereby the liquefied gas may be discharged from the tank under self-generated pressure.

In testimony whereof I affix my signature.

WILLIAM B. LEACH, Jr.